(12) United States Patent
Lee

(10) Patent No.: US 8,999,567 B2
(45) Date of Patent: Apr. 7, 2015

(54) LITHIUM POLYMER BATTERY WITH EXTERNAL SHEATH

(75) Inventor: Hyung Bok Lee, Youngin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 558 days.

(21) Appl. No.: 13/087,778

(22) Filed: Apr. 15, 2011

(65) Prior Publication Data

US 2011/0311843 A1   Dec. 22, 2011

Related U.S. Application Data

(63) Continuation of application No. 11/232,870, filed on Sep. 23, 2005, now Pat. No. 7,964,304.

(30) Foreign Application Priority Data

Sep. 24, 2004   (KR) .................. 10-2004-0077224

(51) Int. Cl.
| | |
|---|---|
| *H01M 2/02* | (2006.01) |
| *H01M 10/0565* | (2010.01) |
| *H01M 10/052* | (2010.01) |
| *H01M 10/058* | (2010.01) |
| *H01M 10/42* | (2006.01) |

(52) U.S. Cl.
CPC .......... *H01M 10/052* (2013.01); *H01M 2/0275* (2013.01); *H01M 2/0277* (2013.01); *H01M 2/0287* (2013.01); *H01M 10/0565* (2013.01); *H01M 10/058* (2013.01); *H01M 10/425* (2013.01); *Y02E 60/122* (2013.01)

(58) Field of Classification Search
CPC ............................. H01M 10/0565; H01M 2/02

USPC ......................................... 429/163, 176, 185
See application file for complete search history.

(56) References Cited

U.S. PATENT DOCUMENTS

| | | | |
|---|---|---|---|
| 6,218,041 B1 | 4/2001 | Barbier et al. | |
| 6,379,838 B1 | 4/2002 | Olsen et al. | |

(Continued)

FOREIGN PATENT DOCUMENTS

| | | |
|---|---|---|
| JP | 05275072 | 10/1993 |
| JP | 2001-176471 | 6/2001 |

(Continued)

OTHER PUBLICATIONS

Japanese Office Action dated Mar. 29, 2011 on JP Application No. 2005-270771, which corresponds to U.S. Appl. No. 11/232,870.

(Continued)

*Primary Examiner* — Tracy Dove
(74) *Attorney, Agent, or Firm* — H.C. Park & Associates, PLC

(57) ABSTRACT

A lithium polymer battery comprising an internal sheath, reinforcement members, and an external sheath and a method for manufacturing the same are provided. The lithium polymer battery comprises a pouch-type internal sheath with an electrode assembly positioned therein and a protective circuit module that is attached to the surface thereof to control the charging and discharging processes of the electrode assembly. The battery further comprises reinforcement members that couple with surfaces of the internal sheath and an external sheath for integrally enclosing the internal sheath and the reinforcement members. The external sheath may comprise a tube, a thermally contractible tube, or a melted resin.

16 Claims, 9 Drawing Sheets

(56) References Cited

U.S. PATENT DOCUMENTS

| | | |
|---|---|---|
| 6,844,105 B1 | 1/2005 | Hanafusa et al. |
| 7,122,276 B2 | 10/2006 | Gu |
| 7,201,998 B2 | 4/2007 | Kim |
| 7,276,313 B2 | 10/2007 | Watanabe et al. |
| 7,410,723 B2 | 8/2008 | Kim et al. |
| 2004/0033416 A1 | 2/2004 | Kim et al. |
| 2004/0038125 A1 | 2/2004 | Kim et al. |
| 2004/0038126 A1 | 2/2004 | Gu |
| 2004/0121231 A1 | 6/2004 | Kim |

FOREIGN PATENT DOCUMENTS

| | | |
|---|---|---|
| JP | 2001-307703 | 11/2001 |
| JP | 2002-245994 | 8/2002 |
| JP | 2003-303580 | 10/2003 |
| JP | 2004-165134 | 6/2004 |
| KR | 2004003153 | 1/2004 |

OTHER PUBLICATIONS

Notice of Allowance of Jan. 11, 2011 in U.S. Appl. No. 11/232,870.

Non-Final Office Action of Oct. 8, 2008 in U.S. Appl. No. 11/232,870.

Final Office Action of Apr. 29, 2009 in U.S. Appl. No. 11/232,870.

Non-Final Office Action of Oct. 19, 2009 in U.S. Appl. No. 11/232,870.

Non-Final Office Action of Apr. 28, 2010 in U.S. Appl. No. 11/232,870.

Final Office Action of Oct. 1, 2010 in U.S. Appl. No. 11/232,870.

LITHIUM POLYMER BATTERY WITH EXTERNAL SHEATH

CROSS REFERENCE TO RELATED APPLICATION

This application is a continuation of U.S. patent application Ser. No. 11/232,870, filed on Sep. 23, 2005, and claims priority to and the benefit of Korean Patent Application No. 10-2004-0077224, filed on Sep. 24, 2004, which are both hereby incorporated by reference for all purposes as if fully set forth herein.

BACKGROUND OF THE INVENTION

1. Field of the Invention

The present invention relates to a lithium polymer battery and a method for manufacturing the same. In particular, the present invention relates to a lithium polymer battery that is capable of forming a simple external sheath while securing reinforcement members and a method for manufacturing the same.

2. Description of the Prior Art

As generally known in the art, a lithium polymer battery has a separator that is positioned in between a positive electrode plate and a negative electrode plate to serve as a medium for ion conductance and as a medium for separating the electrodes in the lithium ion battery. The separator may comprise a gel-type polymer electrolyte, which is prepared by impregnating a polymer with an electrolyte to improve ion conductivity.

In addition to improved ion conductivity, the gel-type polymer electrolyte has the advantages of excellent bonding to electrodes, mechanical properties, and a simple manufacturing process. A PVDF-based electrolyte (available from Bellcore Company) is a gel-type polymer electrolyte that is prepared by mixing a copolymer of vinylidene fluoride (VDF) and hexafluoroethylene (HFE), a plasticizer, and an inorganic additive to form a film, impregnating it with an electrolyte, and causing it to gel.

The characteristics of lithium polymer batteries and lithium ion batteries will now be compared briefly.

Lithium polymer batteries may have a plate structure and do not need to be wound as in the case of lithium ion batteries. Therefore, the electrode assembly comprising a number of positive electrode, a negative electrode, and a separator plates can be laminated and may be suitable for use in a rectangular structure. Of course, lithium polymer batteries can have a wound electrode assembly.

In addition, the electrolyte in a lithium polymer battery is injected into a completely integrated electrode assembly which prevents leakage of the electrolyte.

The plate structure of an electrode assembly of a lithium polymer battery does not require the application of pressure to form a rectangular shape. Therefore, a thin flexible pouch may be used as the battery sheath instead of a hard rectangular or cylindrical can.

When a flexible pouch is used as the sheath of a lithium polymer battery, the thickness of the resulting battery is substantially reduced compared with using a can as the sheath. In addition, more electrode assemblies can be contained in the same volume. This increases the power storage capacity of the battery. The battery can be easily manufactured in any desired shape due to the flexible sheath and can easily be mounted on a variety of external devices.

However, such a pouch-type lithium polymer battery has various problems resulting from its weak protective cover. For example, if the pouch-type sheath of a conventional lithium polymer battery is pierced by a sharp object such as a needle or a nail, a puncture is easily formed. If the sheath is bitten by a pet, it is easily torn off. Furthermore, when a sharp object penetrates the sheath and contacts the internal electrode assembly, the internal positive electrode plate and the negative electrode plate may be short-circuited. The battery may then catch fire or explode.

Conventional lithium polymer batteries do not radiate heat well and this may shorten the lifespan of the battery. The pouch-type sheath basically has an insulation layer that is formed on its surface which degrades radiation performance and cannot actively dissipate that is generated when charging or discharging the battery. Furthermore, as the temperature rises, the rate of discharge increases thus drastically shortening the lifespan of the battery.

When the temperature of the battery rises above a reference level due to over-heating, the electrode assembly or the electrolyte decomposes and a large amount of gas is generated. This causes the sheath to swell easily since it comprises a flexible material. The sheath also swells severely due to heat that is supplied from the exterior.

Meanwhile, the battery sheaths of conventional lithium polymer batteries use metal foil as the core layer. However, the metal foil is exposed to the exterior along the edge of the battery sheath and is very likely to be short-circuited to a conductor of a protective circuit module or an external set.

SUMMARY OF THE INVENTION

The present invention provides a lithium polymer battery that is capable of improving strength and suppressing swelling and a method for manufacturing the same.

Additional features of the invention will be set forth in the description which follows, and in part will be apparent from the description, or may be learned by practice of the invention.

The present invention discloses a lithium polymer battery that comprises a pouch-type internal sheath that has an electrode assembly that is positioned therein and a protective circuit module that is attached to the surface thereof to control the charging and discharging processes of the electrode assembly. The battery further comprises reinforcement members that are fastened to both surfaces of the internal sheath and an external sheath for integrally enclosing the internal sheath and the reinforcement members.

The present invention also discloses a method for manufacturing a lithium polymer battery including the steps of providing an internal pouch-type sheath, placing an electrode assembly inside the internal sheath, and then sealing it. The method also includes coupling a protective circuit module to the electrode assembly outside the internal sheath, fastening reinforcement members to both facing surfaces of the internal sheath, and forming an external sheath to enclose the surface of the-reinforcement members and the internal sheath.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

The lithium polymer battery according to the present invention has reinforcement members that are positioned on both surfaces of the internal sheath which have a comparatively large area to improve overall strength. This reduces the chance of the battery being penetrated by a sharp object or tearing off the internal sheath. Swelling in the battery is also suppressed. In addition, the manufacturing process for the battery is simple and inexpensive.

The reinforcement members that are fastened to the internal sheath also improve the heat radiation. Although the internal sheath has an insulation layer that is formed on its surface it also has a poor thermal conductivity. The reinforcement members that are formed on the surface of the internal sheath have excellent thermal conductivity.

The internal sheath is completely enclosed by the external sheath and the metal film constituting the internal sheath is not being exposed to the exterior. As a result, a short circuit between the metal film and an external object may be prevented.

Figure 1A:
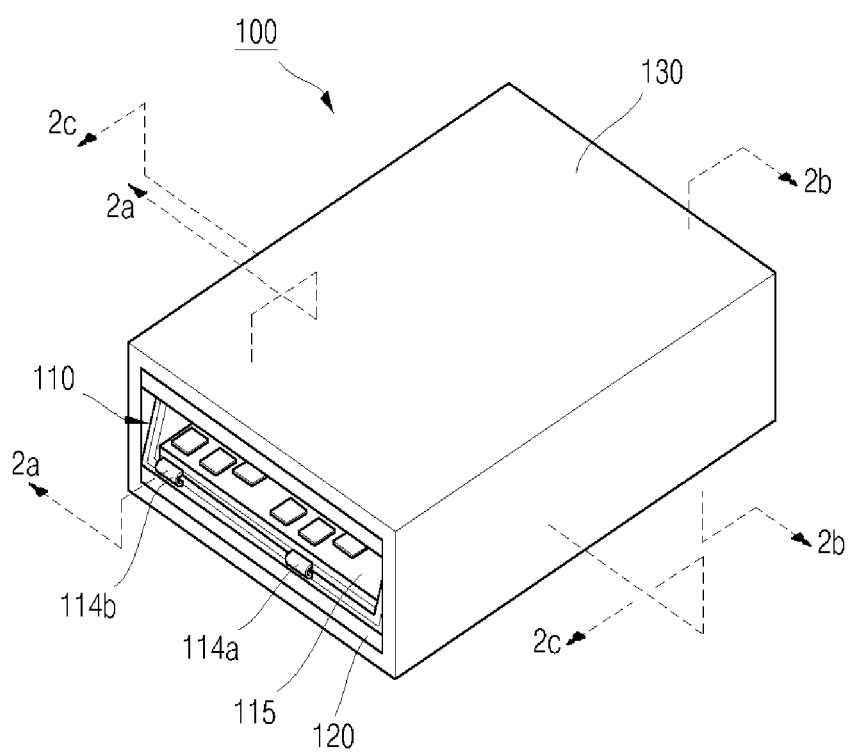
FIG. 1A is a perspective view of a lithium polymer battery according to an embodiment of the present invention.
Figure 1B:
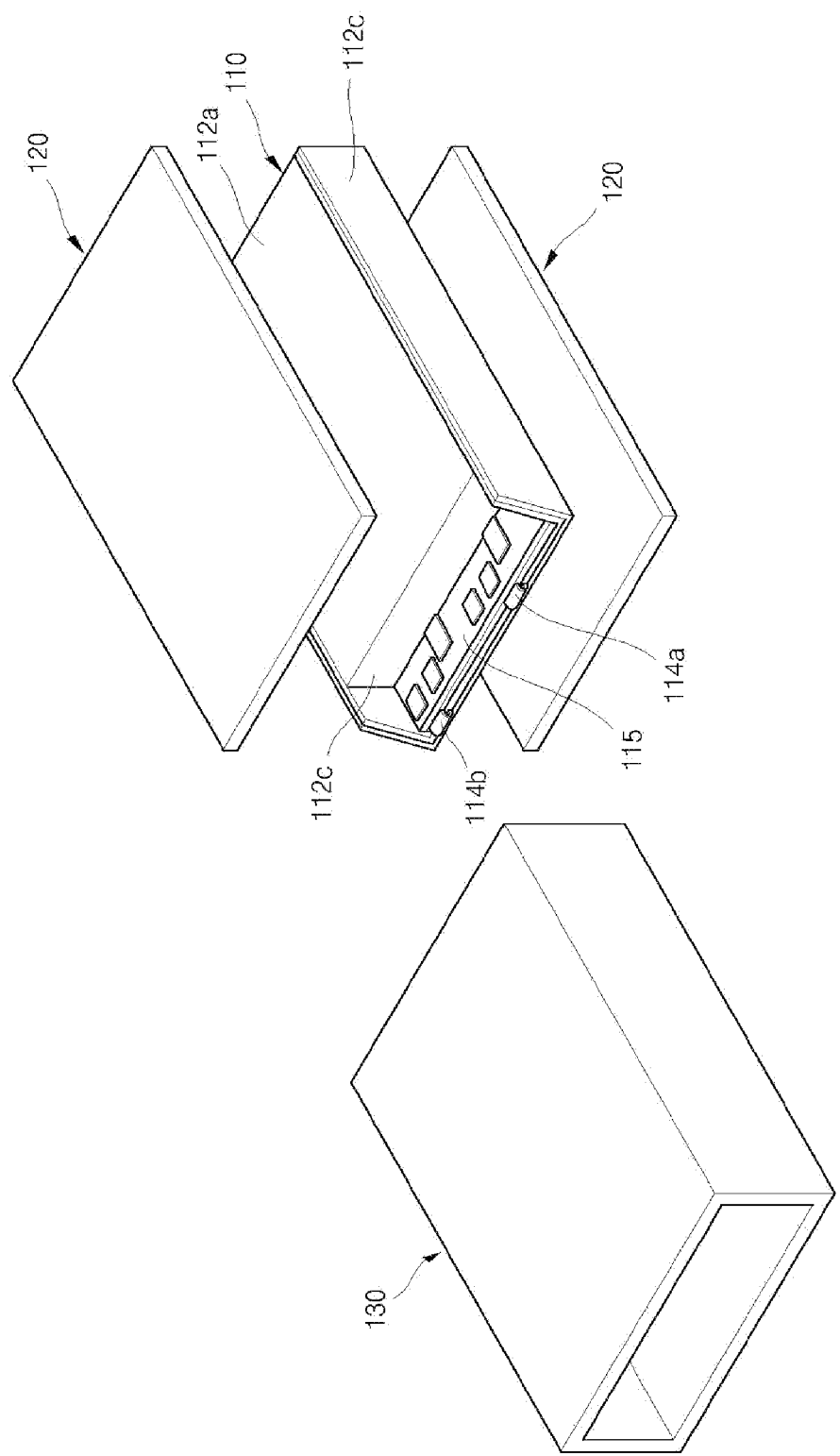
FIG. 1B is a partially exploded perspective view of the lithium polymer battery of FIG. 1A.
Figure 2A:
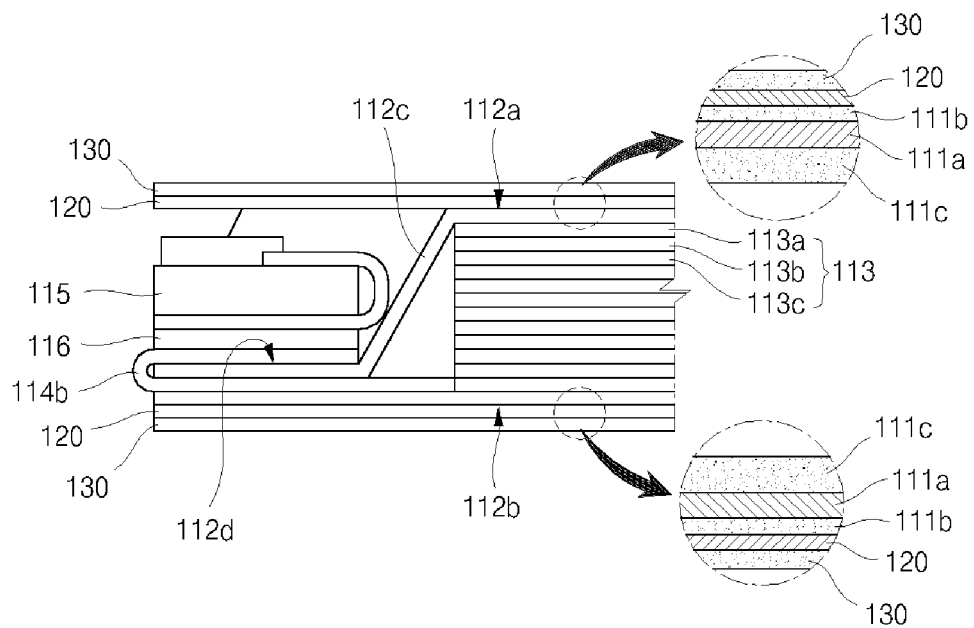
FIG. 2A is a sectional view taken along line 2a-2a of FIG. 1A.
Figure 2B:
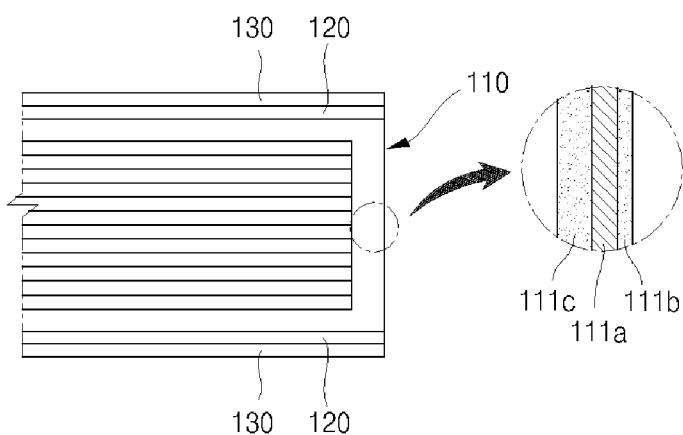
FIG. 2B is a sectional view taken along line 2b-2b of FIG. 1A.
Figure 2C:
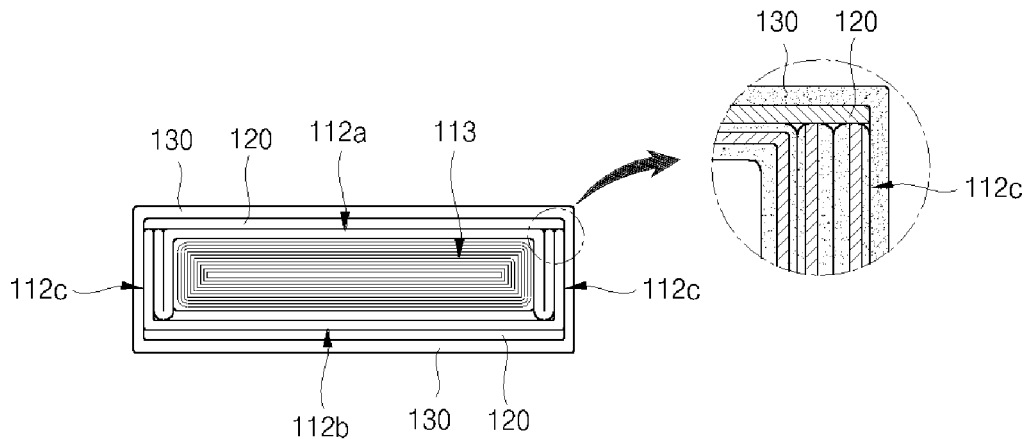
FIG. 2C is a sectional view taken along line 2c-2c of FIG. 1A.

FIG. 1A is a perspective view of a lithium polymer battery according to an exemplary embodiment of the present invention and FIG. 1B is a partially exploded perspective view of the lithium polymer battery shown in FIG. 1A. FIG. 2A is a sectional view taken along line 2a-2a of FIG. 1A, FIG. 2B is a sectional view taken along line 2b-2b of FIG. 1A, and FIG. 2C is a sectional view taken along line 2c-2c of FIG. 1A. FIG. 1A, FIG. 1B, FIG. 2A, FIG. 2B, and FIG. 2C will now be referred to simultaneously.

As shown, a lithium polymer battery 100 according to the present invention generally comprises an internal sheath 110, reinforcement members 120 that are fastened to the internal sheath 110, and an external sheath 130 for enclosing the internal sheath 110 and the reinforcement members 120 together.

The internal sheath 110 has a multi-layered structure comprising a thin metal film 111a, a first insulation layer 111b formed on a surface of the metal film 111a, and a second insulation layer 111c formed on the other surface of the metal film 111a. The metal film 111a may comprise but is not limited to steel, stainless steel, and aluminum.

The first insulation layer 111b acts as the outer surface of the internal sheath 110 and may comprise but is not limited to nylon and polyethylene terephthalate (PET).

The second insulation layer 111c acts as the inner surface of the internal sheath 110 and may comprise but is not limited to cast polypropylene (CPP).

The internal sheath 110 includes a rectangular first region 112a that has a predetermined area and a rectangular second region 112b facing the first region 112a with a predetermined spacing between them that has a larger area than the first region 112a. The internal sheath 110 also includes four third regions 112c that are positioned on the edges of the first regions 112a and second regions 112b to maintain an electrode assembly 113 (described later) in place. An approximately planar fourth region 112d is positioned in front of one of the four third regions 112c while further extending outward a predetermined distance so that a protective circuit module 115 (described later) can be attached.

An electrode assembly 113 including a positive electrode plate 113a, a separator 113b, and a negative electrode plate 113c are placed in the internal sheath 110, which is then sealed. The electrode assembly 113 is wound into a jelly roll to maximize surface area. Positive electrode tab 114a and negative electrode tab 114b are coupled with the positive electrode plate 113a and negative electrode plate 113b, respectively, and extend a predetermined distance to the exterior of the internal sheath 110. In particular, the positive electrode tab 114a and negative electrode tab 114b extend to the exterior via the fourth region 112d of the internal sheath 110.

A protective circuit module 115 is positioned in the fourth region 112d of the internal sheath 110 to control charging/and discharging and to prevent overcharging. The positive electrode tab 114a and the negative electrode tab 114b are coupled with the protective circuit module 115 while being coupled with the electrode assembly 113.

The reinforcement members 120 are fastened to the surfaces of the internal sheath 110. In particular, the reinforcement members 120 are fastened to the first region 112a and second region 112b, which have a comparatively larger area than other regions of the internal sheath 110. The reinforcement members 120 may have the same area as the second region 112b to increase the strength of the internal sheath 110 and to suppress swelling. The reinforcement member 120 that is fastened to the first region 112a is positioned above the protective circuit module 115 with a predetermined spacing between them. The reinforcement members 120 may have a smaller area than the second region 112b, but the area of the reinforcement members 120 is not limited herein.

The reinforcement members 120 may comprise, but are not limited to, a metal plate and a plastic plate. When the reinforcement members 120 comprise a metal plate, the radiation performance further improves. The metal may be steel, stainless steel, or aluminum, for example.

The reinforcement members 120 cover most of the surface of the internal sheath 110 to improve its strength and to prevent it from swelling outward. When the reinforcement members 120 comprise a metal plate that has excellent thermal conductivity, the radiation performance of the internal sheath 110 improves.

The external sheath 130 is coupled with the outer surface of the reinforcement members 120 and to both third regions 112c of the internal sheath 110 that are positioned between the reinforcement members 120. The external sheath 130 may comprise a tube, a thermally contractible tube, and a molded resin, for example.

The thermally contractible tube used as the external sheath 130 may be a high-molecular weight composite resin that is cross-linked by radioactive radiation and preferably contracts at a constant ratio of about 25-75% when heated at temperatures ranging from 90° C. to 130° C. A thermally contractible tube has excellent heat insulation properties and improves the electrical insulation, waterproofing, and exterior protection function of the internal sheath 110.

The resin is plasticized by heating plastic and shaping it with a mold to enclose the internal sheath 110 and the reinforcement members 120. The resin generally has a melting point ranging from 160° C. to 300° C. Preferably, the resin has a low melting point because extremely high temperatures affect various electronic components 116 of the protective circuit module 115.

The external sheath 130 may have a structure wherein a side is open to expose the protective circuit module 115 that is positioned in the fourth region 112*d* of the internal sheath 110 to the exterior. A side of the external sheath 130 that is opposite the protective circuit module 115 may also be open. Such a structure is naturally formed when the external sheath 130 is made of a tube or a thermally contractible tube. When the external sheath 130 comprises a resin, however, a side thereof facing the protective circuit module 115, as well as the opposite side, may be enclosed. The external sheath 130 may also be injection-molded to have a side open toward the protective circuit module 115, as well as a side open in the opposite direction, as when a thermally contractible tube is used.

The outer sheath 130 provides insulation and prevents the metal film 111*a* of the internal sheath 110 from being exposed to the exterior. Therefore, the possibility that the metal film 111*a* will be short-circuited to a conducting external object decreases. In addition, the external sheath 130 protects the lithium polymer battery 110 of the present invention from its external environment.

Figure 3:
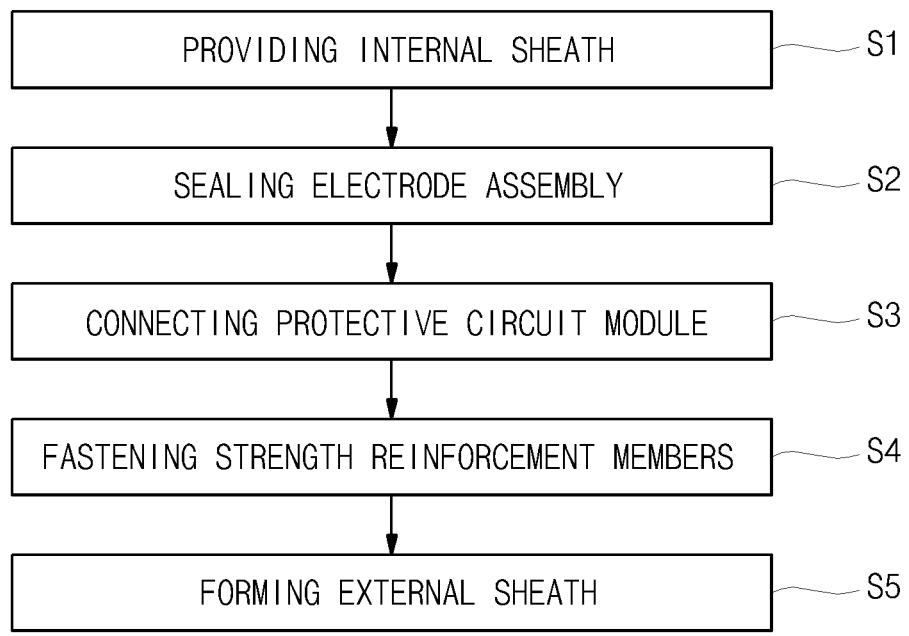
FIG. 3 is a flowchart illustrating a method for manufacturing a lithium polymer battery according to an embodiment of the present invention.

FIG. 3 is a flowchart illustrating a method for manufacturing a lithium polymer battery according to an exemplary embodiment of the present invention. FIG. 4A, FIG. 4B, FIG. 4C, FIG. 4D, FIG. 4E, FIG. 4F, FIG. 4G, and FIG. 4H are perspective views of the manufacturing steps that are illustrated in FIG. 3. For convenience of understanding, FIG. 3 and FIG. 4A, FIG. 4B, FIG. 4C, FIG. 4D, FIG. 4E, FIG. 4F, FIG. 4G, and FIG. 4H will now be referenced together to describe a method for manufacturing a lithium polymer battery according to the present invention.

As shown in FIG. 3, a method for manufacturing a lithium polymer battery 100 according to an exemplary embodiment of the present invention includes the steps of S1 providing an internal sheath 110, S2 sealing an electrode assembly 113, S3 connecting a protective circuit module 115, S4 fastening reinforcement members 120, and S5 forming an external sheath 130.

Figure 4A:
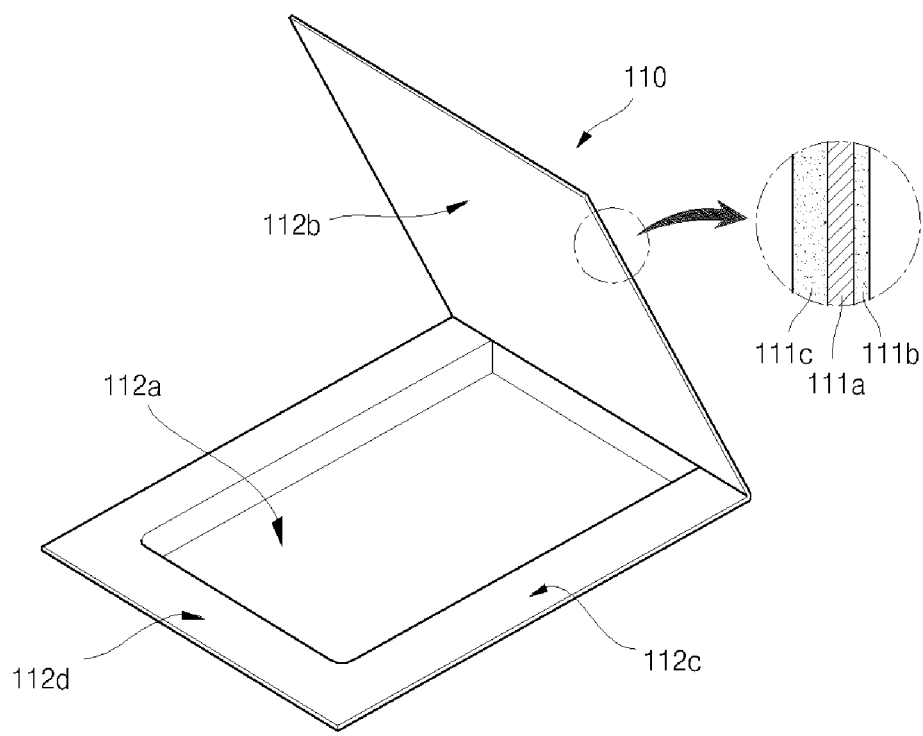
FIG. 4A, FIG. 4B, FIG. 4C, FIG. 4D, FIG. 4E, FIG. 4F, FIG. 4G, and FIG. 4H are perspective views of manufacturing steps of the method illustrated in FIG. 3.

In the step S1 of providing an internal sheath 110, a pouch-type internal sheath 110 is provided. As shown in FIG. 4A, the internal sheath 110 includes a first region 112*a* that is formed at a predetermined depth in the interior of the internal sheath 110, a second region 112*b* for covering the first region 112*a*, a third region 112*c* formed between the first and second regions 112*a* and 112*b* that is to be bent in a predetermined direction at a later time, and a fourth region 112*d* on which a protective circuit module is to be placed at a later time. The layered structure of the internal sheath 110, as mentioned above, includes an approximately planar metal film 111*a*, a first insulation layer 111*b* that is formed on a surface of the metal film 111*a*, and a second insulation layer 111*c* that is formed on the other surface of the metal film 111*a*.

Figure 4B:
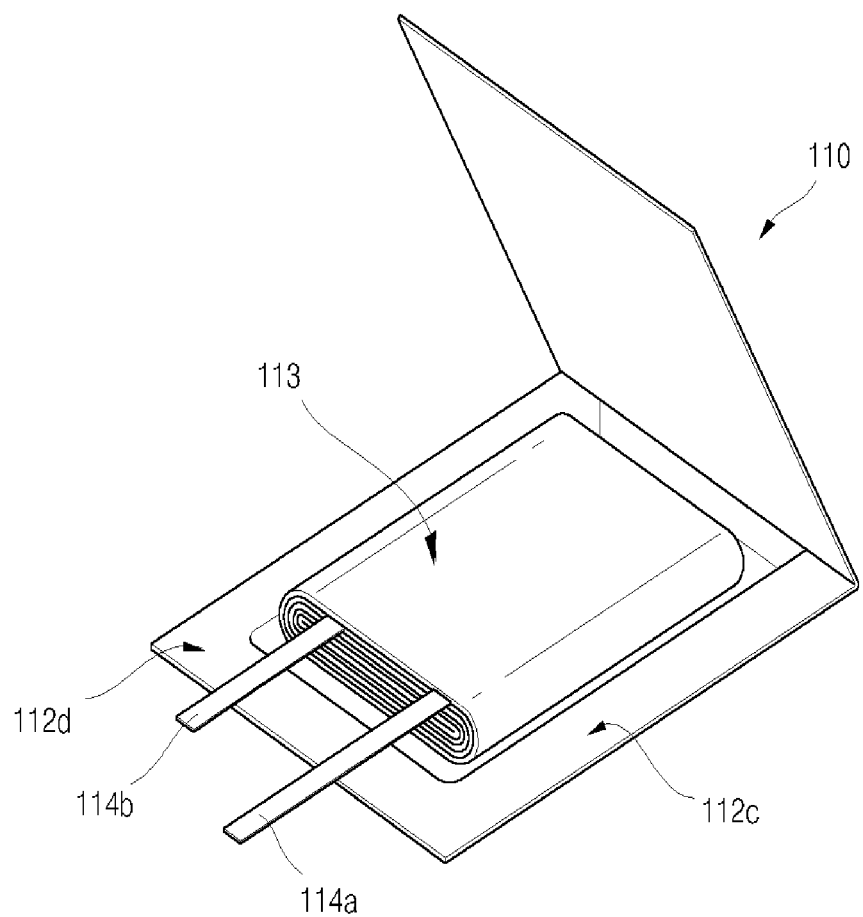

In the step S2 of sealing an electrode assembly 113, an electrode assembly 113 is placed in the first region 112*a* of the internal sheath 110 which has been formed at a predetermined depth, as shown in FIG. 4B. The third region 112*c* and fourth region 112*d* of the internal sheath 110 are then thermally bonded to maintain the electrode assembly 113 in place.

Figure 4C:
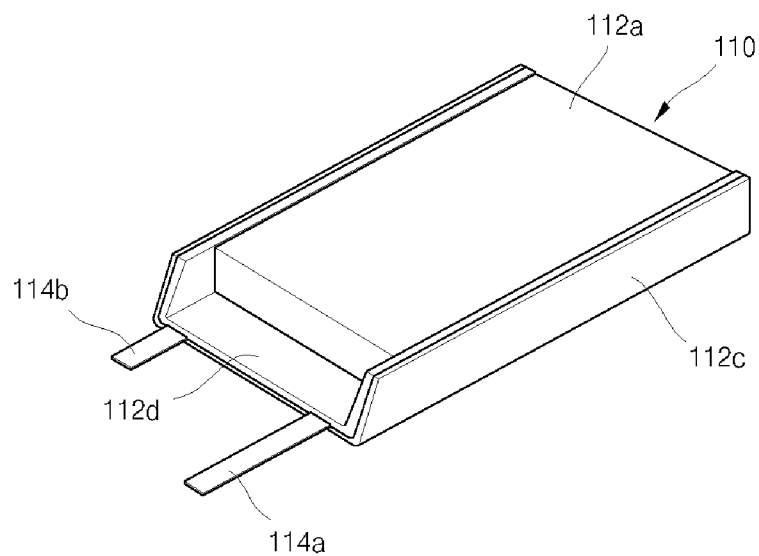

The electrode assembly 113 has a positive electrode tab 114*a* and negative electrode tab 114*b* that are formed thereon which extend a predetermined distance over the fourth region 112*d* to the exterior, as shown in FIG. 4C. The third regions 112*c* are bent toward the outer surface of the first region 112*a* to minimize the volume of the internal sheath 110.

Figure 4D:
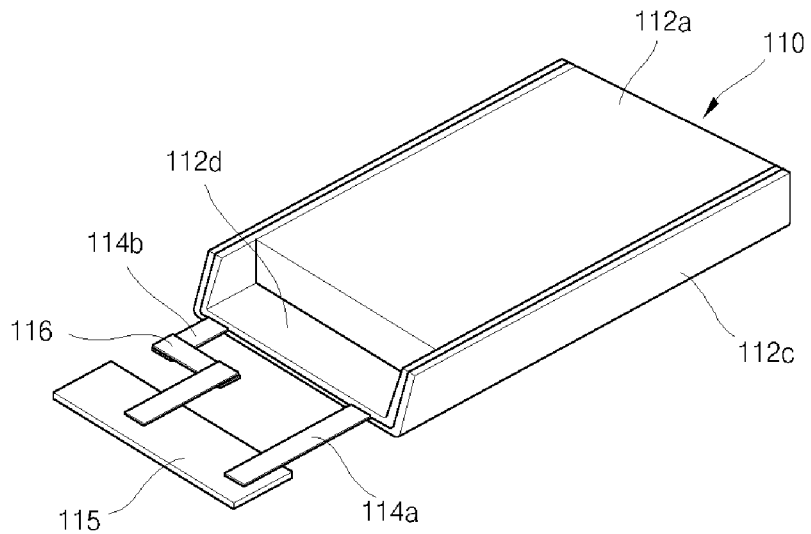
Figure 4E:
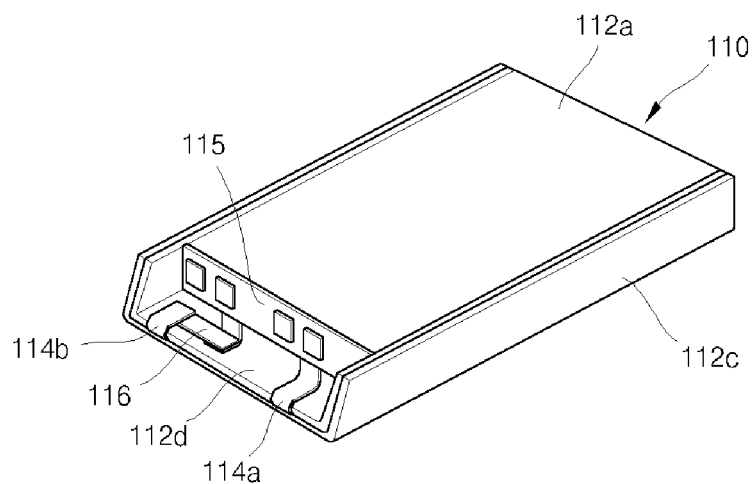
Figure 4F:
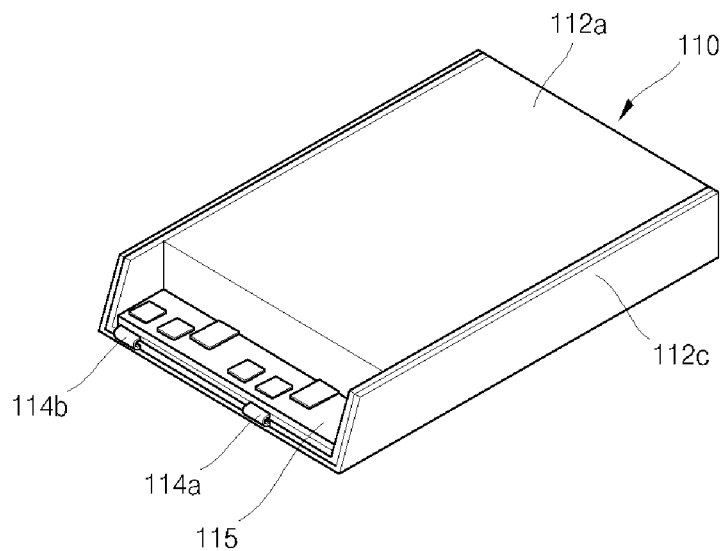

In the step S3 of connecting a protective circuit module 115, a protective circuit module 115 is connected to the positive electrode tab 114*a* and negative electrode tab 114*b* which extend a predetermined distance through the internal sheath 110 to the exterior, as shown in FIG. 4D. A PTC device 116 may be interposed between the negative electrode tab 114*b* and the protective circuit module 115 to interrupt current when the battery temperature rises above a reference level. The PTC device 116 may also be positioned inside the protective circuit module 115. After the connecting step, the positive electrode tab 114*a* and negative electrode tab 114*b* are bent at a predetermined angle as shown in FIG. 4E and FIG. 4F to safely position the protective circuit module 115 in the fourth region 112*d* of the internal sheath 110.

Figure 4G:
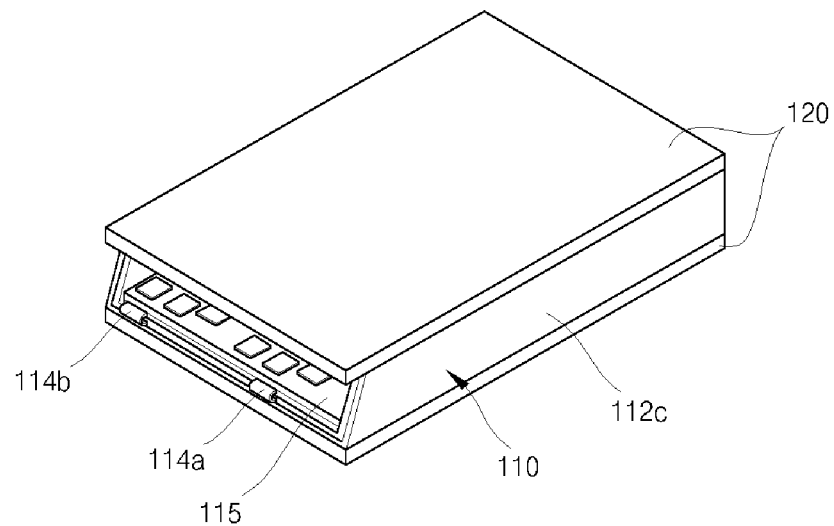

In the step S4 of fastening reinforcement members 120, reinforcement members 120 are fastened to the first region 112*a* and second region 112*b* of the internal sheath 110, to respectively, as shown in FIG. 4G. Although the reinforcement members 120 are shown to have the same area as the second region 112*b* in the drawing, they may have the same area as the first region 112*a* or a smaller area than the first region 112*a* and second region 112*b*.

Figure 4H:
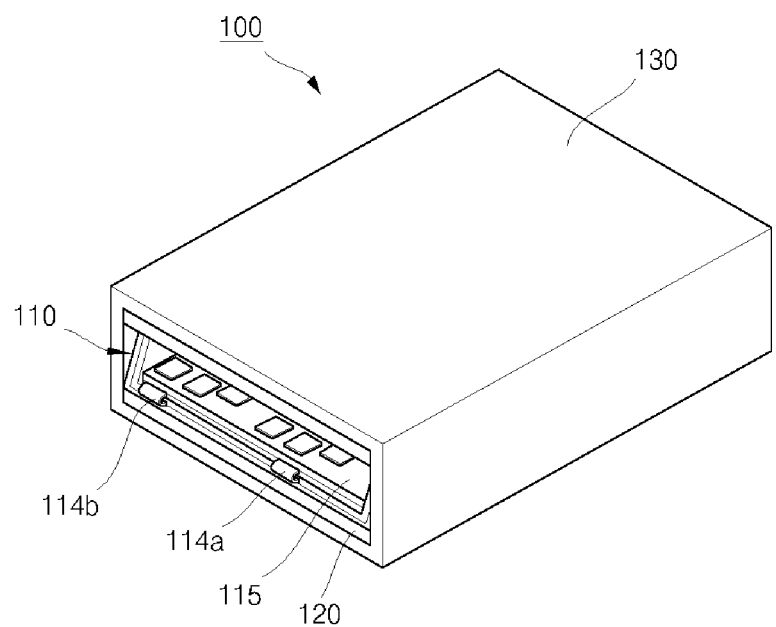

In the step S5 of forming an external sheath 130, an external sheath 130 is formed to enclose the reinforcement members 120 and the third region 112*c* of the internal sheath 110 as shown in FIG. 4H.

The external sheath 130 may generally be formed in two methods.

In the first method, the internal sheath 110 and reinforcement members are inserted into a thermally contractible tube with the reinforcement members 120 fastened thereto. The thermally contractible tube is then heated to a temperature of 90° C.-130° C. so that it contracts and couples with the surface of the reinforcement members 120 and the internal sheath 110. The protective circuit module 115 that is attached to the internal sheath 110 and the opposite side of the internal sheath 110, are exposed to the exterior. This allows the external sheath 130 of the lithium polymer battery 100 to have improved strength and to be formed simply and inexpensively. Alternatively, the external sheath 130 may be formed by inserting the internal sheath 110 with the reinforcement members 120 fastened thereto into a conventional tube, instead of a thermally contractible tube.

In the second method, the internal sheath 110 may be positioned in a mold with the reinforcement members 120 fastened thereto. A melted resin at a high temperature and pressure is then injected into the mold and cured so that it encloses the surface of the reinforcement members 120 and the internal sheath 110. In this case, both the protective circuit module 115 and the opposite side of the internal sheath 110 may be enclosed by the melted resin, but this feature is not limited in the present invention.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A battery, comprising:
an internal sheath;
an electrode assembly disposed in the internal sheath;
a reinforcement member coupled with an outer surface of the internal sheath; and
an external sheath coupled with the internal sheath and the reinforcement member,
wherein a length of the reinforcement member is greater than a length of the electrode assembly, a length of the external sheath is greater than the length of the electrode assembly, or both the length of the reinforcement member and the length of the external sheath are greater than the length of the electrode assembly, and
wherein the external sheath comprises a tube comprising a first side and a second side, the first side and the second side being open ends of the tube exposing the internal sheath.

2. The battery of claim 1,
wherein the external sheath comprises an injection-molded resin, and
wherein the injection-molded resin encloses the internal sheath and the reinforcement member.

3. The battery of claim 1,
wherein the reinforcement member comprises a metal plate or a plastic plate.

4. The battery of claim 1,
wherein the reinforcement member comprises a material selected from the group consisting of steel, stainless steel, and aluminum.

5. A battery, comprising:
an internal sheath;
an electrode assembly disposed in the internal sheath;
a reinforcement member coupled with an outer surface of the internal sheath; and
an external sheath coupled with the internal sheath and the reinforcement member,
wherein a length of the reinforcement member is greater than a length of the electrode assembly, a length of the external sheath is greater than the length of the electrode assembly, or both the length of the reinforcement member and the length of the external sheath are greater than the length of the electrode assembly, and
wherein the external sheath is a thermally contractible tube.

6. The battery of claim 1,
wherein the internal sheath comprises:
a rectangular first region having a first area;
a rectangular second region spaced apart from the first region and having a second area larger than the first area; and
four third regions between the first region and the second region.

7. The battery of claim 5,
wherein the reinforcement member comprises a first reinforcement member and a second reinforcement member, wherein the first reinforcement member is coupled with the first region of the internal sheath, and the second reinforcement member is coupled with the second region of the internal sheath.

8. The battery of claim 7,
wherein an area of the second reinforcement member equals the second area.

9. The battery of claim 7,
wherein an area of the first reinforcement member is equal to or greater than the first area.

10. The battery of claim 7, wherein a length of the second reinforcement member is equal to or greater than a length of the rectangular first region.

11. The battery of claim 6,
wherein the external sheath is coupled with an outer surface of the reinforcement member and to at least two third regions of the internal sheath.

12. The battery of claim 1,
wherein the internal sheath comprises:
a metal film;
a first insulation layer disposed on a first surface of the metal film; and
a second insulation layer disposed on a second surface of the metal film, the first surface and the second surface being opposite surfaces of the metal film.

13. The battery of claim 12,
wherein the metal film comprises a material selected from the group consisting of steel, stainless steel, and aluminum.

14. The battery of claim 12,
wherein the first insulation layer comprises a material selected from the group consisting of nylon and polyethylene terephthalate (PET).

15. The battery of claim 12,
wherein the second insulation layer comprises cast polypropylene (CPP).

16. A battery, comprising:
an internal sheath;
an electrode assembly disposed in the internal sheath;
a reinforcement member coupled with an outer surface of the internal sheath; and
an external sheath coupled with the internal sheath and the reinforcement member,
wherein a length of the reinforcement member is greater than a length of the electrode assembly, a length of the external sheath is greater than the length of the electrode assembly, or both the length of the reinforcement member and the length of the external sheath are greater than the length of the electrode assembly,
wherein the internal sheath comprises a metal film disposed between a first insulation layer and a second insulation layer, and
wherein the reinforcement member comprises a first metal plate and a second metal plate spaced apart from the first metal plate, and
wherein the internal sheath is disposed between the first metal plate and the second metal plate.

* * * * *